United States Patent
Hankinson et al.

(10) Patent No.: US 8,303,036 B2
(45) Date of Patent: Nov. 6, 2012

(54) AIRCRAFT SEAT

(75) Inventors: Christopher Hankinson, Kingsley (GB); Michael Roy Hudswell, Southwell (GB)

(73) Assignee: Contour Aerospace Ltd. (GB)

( * ) Notice: Subject to any disclaimer, the term of this patent is extended or adjusted under 35 U.S.C. 154(b) by 377 days.

(21) Appl. No.: 12/529,613

(22) PCT Filed: Mar. 7, 2008

(86) PCT No.: PCT/GB2008/000794
§ 371 (c)(1),
(2), (4) Date: Apr. 14, 2010

(87) PCT Pub. No.: WO2008/107689
PCT Pub. Date: Sep. 12, 2008

(65) Prior Publication Data
US 2010/0201172 A1    Aug. 12, 2010

(30) Foreign Application Priority Data

Mar. 8, 2007 (GB) .................................. 0704546.1

(51) Int. Cl.
*B60N 2/02* (2006.01)
(52) U.S. Cl. ......... 297/342; 297/317; 297/322; 297/340
(58) Field of Classification Search ............... 297/68, 297/83, 84, 340, 341, 342, 411.35, 411.36, 297/317, 318, 322
See application file for complete search history.

(56) References Cited

U.S. PATENT DOCUMENTS

| 2,102,979 | A | * | 12/1937 | Smith | 297/216.19 |
| 3,934,929 | A | | 1/1976 | Rabinowitz | |
| 4,637,652 | A | | 1/1987 | Bergenwall | |
| 5,785,384 | A | * | 7/1998 | Sagstuen | 297/317 |
| 6,059,364 | A | | 5/2000 | Dryburgh | |
| 6,170,786 | B1 | * | 1/2001 | Park et al. | 248/274.1 |
| 6,227,489 | B1 | * | 5/2001 | Kitamoto et al. | 244/118.5 |
| 6,494,536 | B2 | * | 12/2002 | Plant | 297/284.11 |
| 7,156,462 | B2 | * | 1/2007 | Verny et al. | 297/354.13 |
| 2003/0080597 | A1 | | 5/2003 | Beroth | |
| 2004/0004383 | A1 | | 1/2004 | Laurent | |

* cited by examiner

*Primary Examiner* — Peter Brown
*Assistant Examiner* — Philip Gabler (57) ABSTRACT

An aircraft seat having a movable squab and backrest, and a fixed seat chassis is presented. A mechanism for moving the squab and backrest has a linear runner mounted on the seat chassis and includes a linear drive for extending (and retracting) the assembly between a retracted position and an extended position. A first cam track allows adjustment the height of the back edge of the seat squab, the first cam track being generally parallel to the linear runner through the majority of its length and having a rearmost substantially vertical portion. A first cam follower mechanism interconnects a back edge of the seat squab, the first cam track and the linear drive, for motion of the seal squab. A second cam track is provided for adjusting the inclination of the backrest and a second follower is connected to the seatback.

10 Claims, 8 Drawing Sheets

AIRCRAFT SEAT

The present invention relates to an aircraft seat.

In the spatially limited environment of an aircraft, the area of personal space of a passenger is tightly controlled and is defined predominantly by the space between the passenger's seat and the seat in front.

However, when a passenger reclines the backrest of his seat, rather than the backrest simply pivoting back about its connection with the seat squab as would be the case with a car seat, for instance, in one type of aircraft seat, the seat squab moves forward a little to accommodate the inclination of the backrest, thereby minimising the impact of the reclining seat on the personal space of the passenger in the seat behind. The forwards movement of the seat squab limits the leg room remaining available to the first passenger, giving him the choice of an upright seat with maximised leg room or a reclined seat with reduced leg room.

One solution to this problem would be to incline the seat squab downwards in the direction of the backrest, thus allowing the backrest without taking up as much additional space. This arrangement allows the backrest to be inclined without the need for forward motion of the seat squab thus avoiding the reduction in leg room for the passenger.

Such seats do exist in the prior art, but are complex arrangements requiring multiple actuators including a dedicated actuator to drive the movement of the seat squab and a further dedicated actuator to drive the movement of the backrest. Thus the resultant seat mechanism is complex and expensive and the presence of multiple actuators increases the likelihood of malfunction of the seat mechanism and thus increases the maintenance and service costs of the seat.

The object of the present invention is to provide an improved aircraft seat.

According to the invention there is provided an aircraft seat comprising:
- a seat having:
  - a squab and a backrest, both being movable and
  - a seat chassis, via which the seat can be fixed to a floor,
- a mechanism for moving the squab and the backrest, the mechanism having:
  - a linear runner mounted on the seat chassis,
  - a seat frame sub-frame bearingly mounted on the linear runner,
    - the squab being pivotally on the sub-frame substantially at its front edge and
    - the backrest being pivotally mounted on the squab substantially at the back edge of the squab and the bottom of the backrest,
  - linear drive means for extending (and retracting) the sub-frame on the runner with respect to the seat chassis between a retracted, TTL position and an extended position,
  - a first cam track in a first cam track member fast with the seat chassis for adjusting the height of the back edge of the seat squab, the first cam track being generally parallel to the linear runner through the majority of its length and having a rearmost substantially vertical portion,
  - a first cam follower mechanism interconnecting back edge of the seat squab, the first cam track and the linear drive means, for linear drive of the sub-frame with height adjustment of the rear edge of the seat squab,
    - the arrangement being such that whilst the first cam follower mechanism is co-operating with the rearmost, substantially vertical portion of the cam track, the at least predominant effect of the linear drive means is lowering (and raising) of the rear of the seat squab with respect to the front of the seat squab,
  - a second cam track fast with the seat chassis for adjusting the inclination of the backrest and
  - a second follower connected to the seatback and engaged with the second cam track.

Normally the aircraft seat will be one convertible to a bed.

Alternative arrangements are possible for the cam track members. In particular, the first cam track can be provided at least substantially centrally of the seat, below the seat squab, with second cam track members duplicated at the sides of the seat. Alternatively, the first cam track member can be duplicated at the sides of the seat, with the second cam track being duplicated in the first cam track members.

In the preferred embodiment, the first cam follower mechanism comprises a bell crank pivoted at its elbow to the sub-frame, linked to the seat squab by an upper link pivoted to one arm of the crank, at which it engages the first cam track and linked to the drive means by a lower link pivoted to the other arm of the crank, the arrangement being such that, beyond the first portion of the stroke, linear movement of the drive means is converted to the linear movement of the sub-frame via the bell crank with or without adjustment of the height of the rear edge of the seat squab in accordance with the inclination of the first cam track with respect to the linear runner.

Preferably, the bell crank is pivoted to the subframe above the linear drive means, with the one arm being directed backwards and the upper link extending upwards to the seat squab and the other arm being directed downwards with the lower link extending backwards to the drive means.

Further, the preferred embodiment includes a leg rest pivoted to lift it from below the front edge of the seat squab and a mechanism for lifting the leg rest and a lost motion connection between the chassis and the mechanism operating at the end of forwards travel of the seat to cause the mechanism to deploy the leg rest.

The preferred embodiment also includes an arm rest adjacent the seat squab, a mechanism for raising and lowering the arm rest and a lost motion connection between the mechanism and the sub-frame operating at the end of forwards travel of the seat to cause it to lower the arm rest.

To help understanding of the invention, a specific embodiment thereof will now be described by way of example and with reference to the accompanying drawings, in which.

Figure 9:
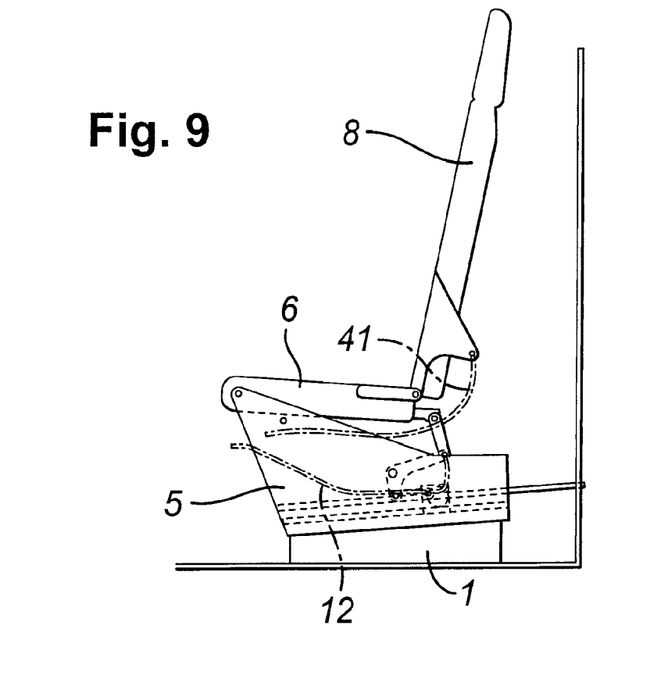
FIG. 9 is a simplified view of the seat in TTL position.
Figure 10:
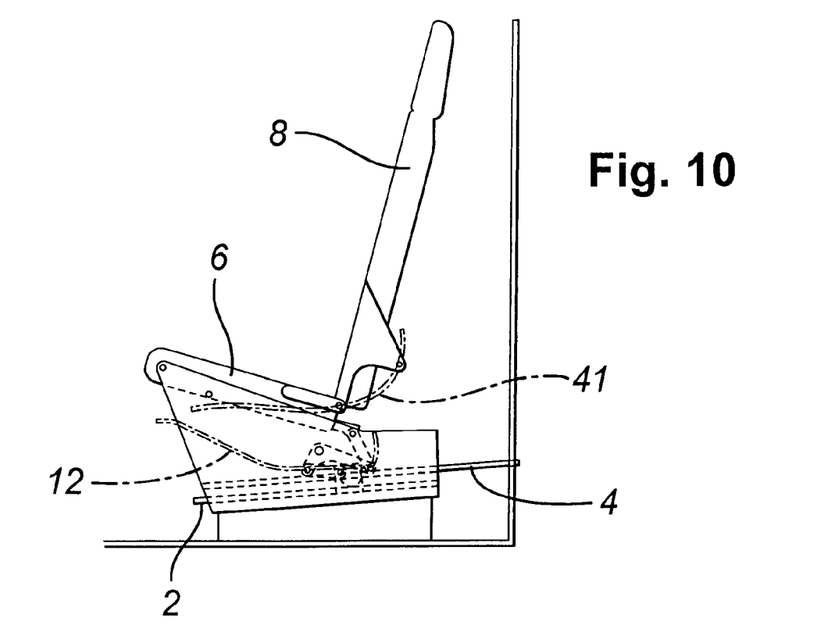
FIG. 10 is a simplified view of the seat in sitting position with the seat squab lowered at the back to incline it.
Figure 11:
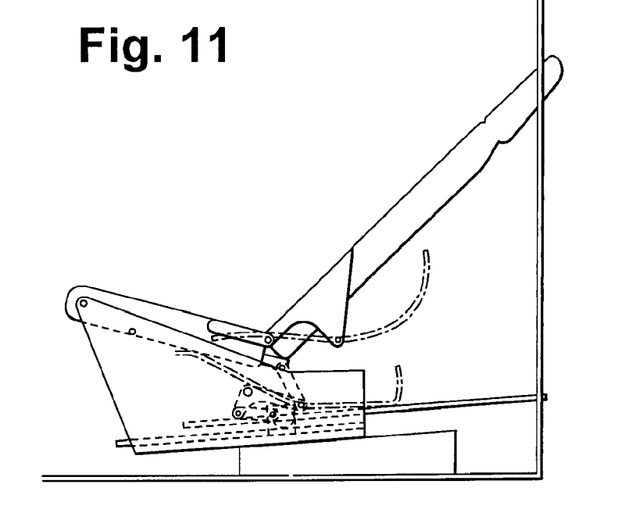
FIG. 11 is a simplified view of the seat in lounging position with the seat squab inclined and the backrest considerably reclined.

Referring to the drawings, the aircraft seat convertible to a bed thereshown has a chassis 1, see FIG. 9, on which is mounted via linear bearings 2 at each side a subframe 3. The linear bearing inclines slightly towards the front. A linear actuator 4 is provided between and parallel to the linear bearings, to drive the subframe forwards to convert the seat to bed mode and backwards to convert it to sitting mode and in particular a TTL position—that is to say a Taxi, Take-off and Landing position.

The subframe has two side plates 5, between which a seat squab 6 is pivotally mounted at its front edge via a pivot 7. A back rest 8 is pivoted at its bottom by a hinge 9 to the rear edge of the seat squab.

Figure 1:
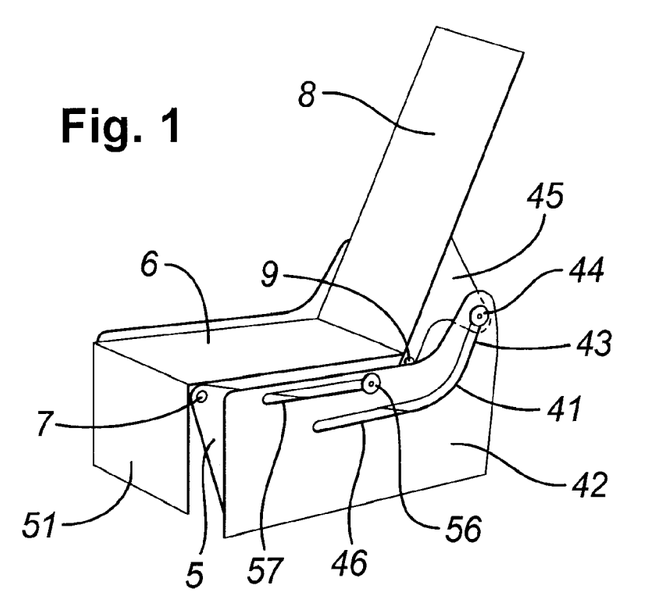
FIG. 1 is a diagrammatic perspective view of an aircraft seat in accordance with the invention, with arms and side panels removed to show a cam plate for controlling the inclination of a back rest in the seat.
Figure 2:
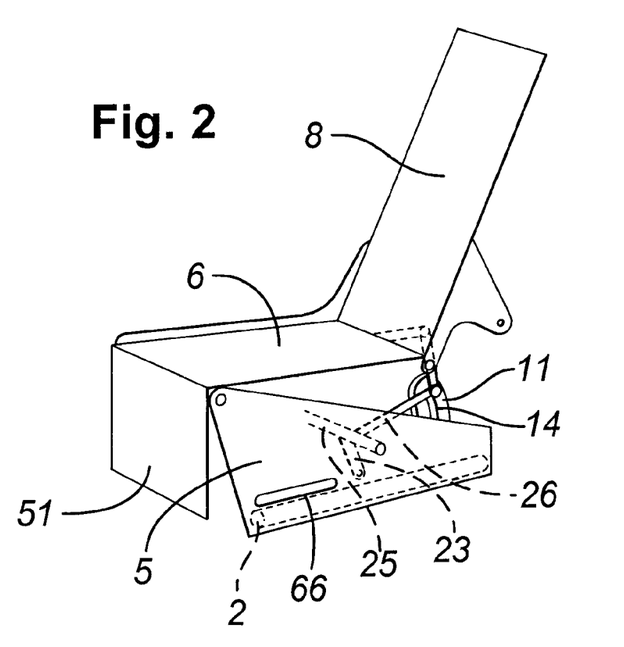
FIG. 2 is a similar diagrammatic view of the seat of FIG. 1, with the cam plate removed to show a subframe side plate pivotally supporting the front and a seat squab in the seat.
Figure 3:
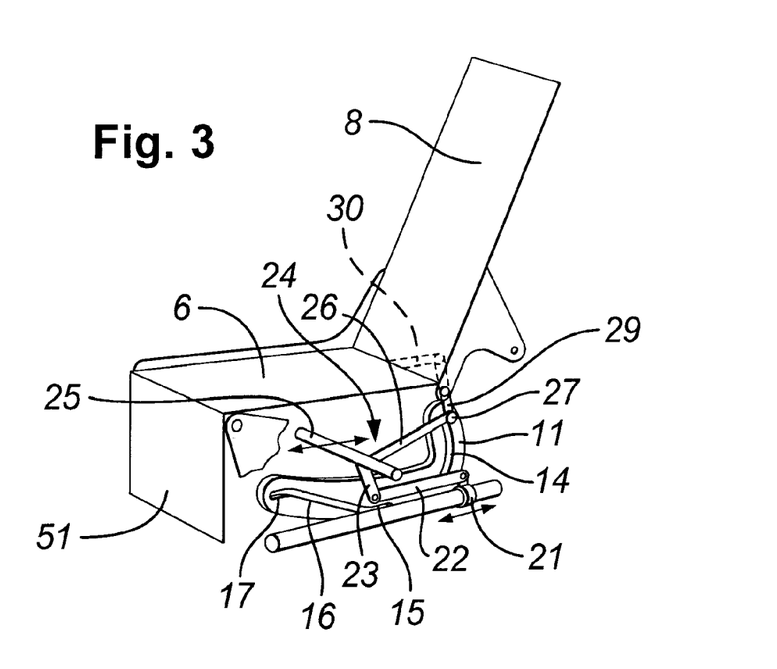
FIG. 3 is a third similar view with the subframe side plate removed showing a cam plate and follower mechanism for controlling the inclination of the seat squab.
Figure 4:
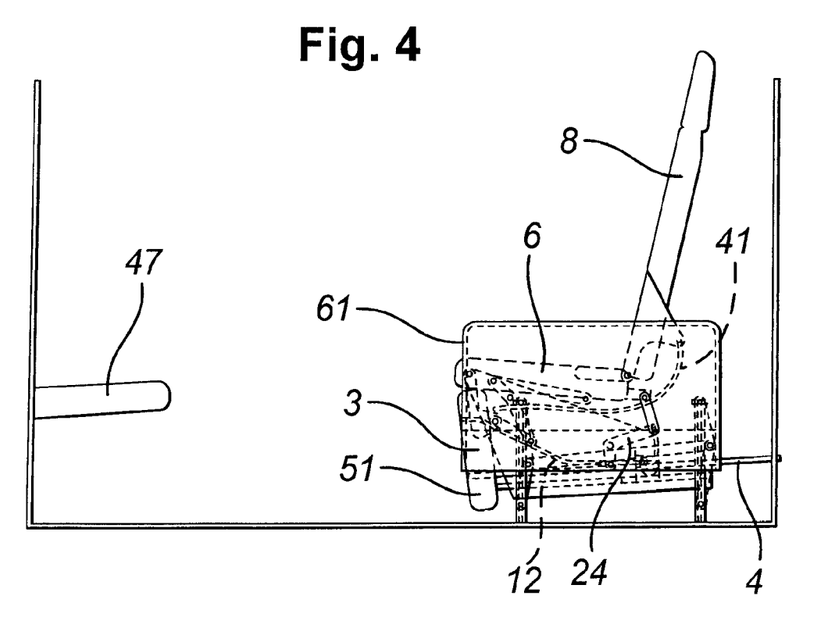
FIG. 4 is side view of a seat unit including the seat of FIG. 1 and an ottoman, with the seat in TTL position.
Figure 5:
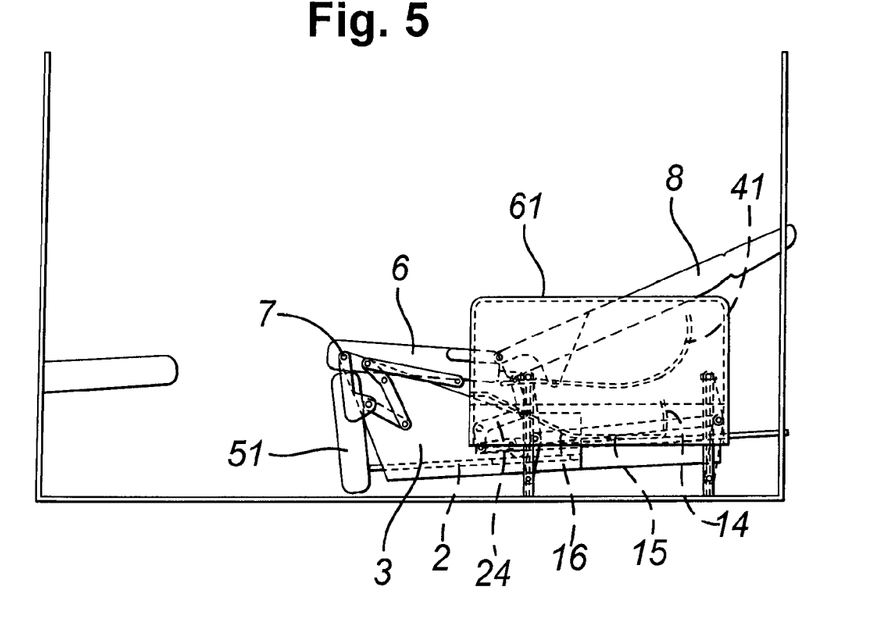
FIG. 5 is a view similar to FIG. 4 showing the seat in nearly fully reclined, bed mode.
Figure 6:
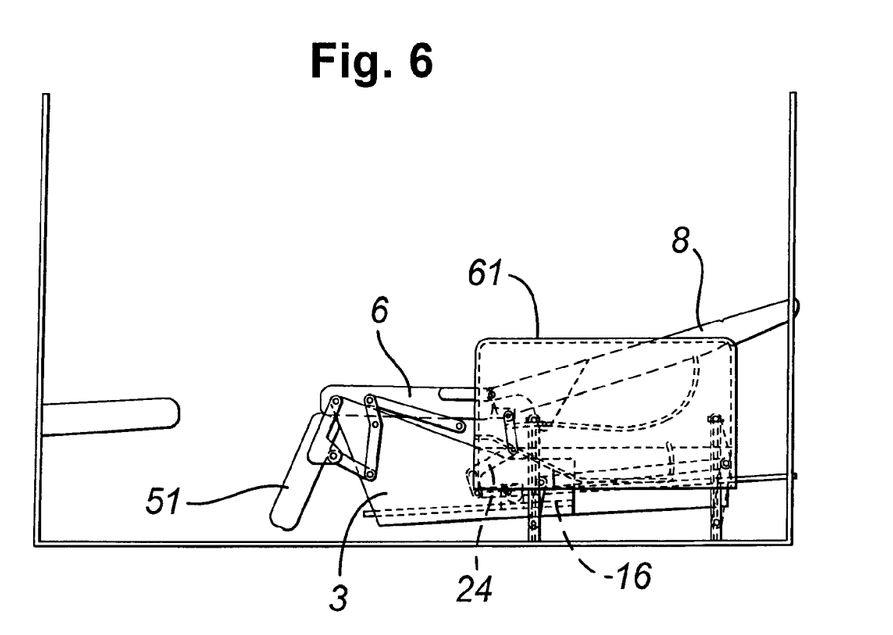
FIG. 6 is a similar to FIG. 5 showing a leg rest deploying.
Figure 7:
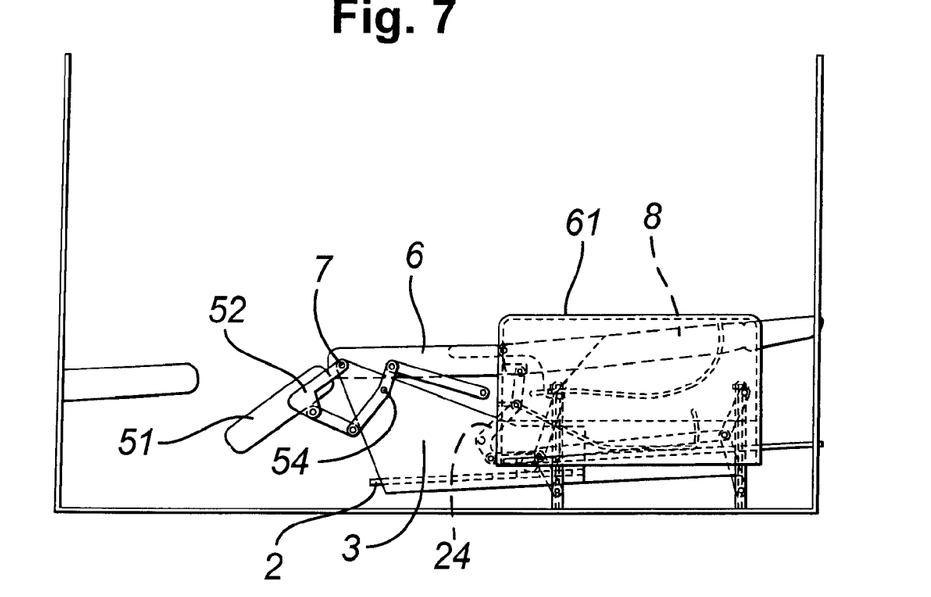
FIG. 7 is a similar view showing the seat in the final stage of movement to deploy the leg rest.

Centrally beneath the seat squab a first cam plate 11, see FIGS. 2 & 3, is mounted on the chassis alongside the linear actuator. It has a first cam track 12, with the following portions, starting at the rear:

a substantially upright, though arcuately curved, rear portion 14;

a forwards extending portion 15, parallel with the linear bearings;

a upwards ramped forwards extending portion 16 inclined upwards with respect to the linear bearing;

a short front portion 17, parallel to the portion 15.

The linear actuator has a drive member 21 movable along the actuator. It is linked by a lower, forwards extending link 22 to a downwards extending arm 23 of a bell crank 24. This is pivotally carried on a cross-shaft 25 extending between the side plates 5 of the subframe 3 above the linear actuator. The bell crank has a rearwards extending arm 26 carrying a cam follower 27 engaged with the cam track 12. From the cam follower, the bell crank is linked by an upper, upwards extending link 29 to the rear of the seat squab. The upper link is pivoted to a projection 30 rearwards of the seat squab.

This mechanism operates to drive the seat on its subframe forwards and backwards with movement of the linear actuator, the lower arm of the bell crank being short whereby coupling of the actuator to the sub-frame is close, with the actual orientation of the arm being determined by the height above the actuator of the first cam track 12 at the cam follower. Since the cam track and the follower are of the type that co-operate on both sides, there is a unique one-to-one positioning of the seat as regards its longitudinal position of the seat squab and it is inclination for the longitudinal position of the linear actuator.

When the seat is driven rearwards, towards its TTL position, the cam approaches the upwards extending portion 14 of the cam track. As the actuator is continued to be operated, the cross-shaft 25 reaches the centre of the curvature which the portion 14 has. So the follower runs up the cam portion, without longitudinal movement of the subframe. Once the follower is at the top of cam portion, and the actuator is stopped the seat is held in its TTL position.

Fast with the chassis, within the side plates of the subframe, a pair of second cam track 41 plates 42 are provided. These tracks are generally horizontal and curve upwards at their rear ends with substantially vertical ends 43. Cam followers 44 engage these tracks and are carried by flanges 45 extending back from lower parts of the backrest 8. Thus these tracks determine the upright/recline angle of the backrest, in conjunction with the height of the back of the seat squab, to which the backrest is hinged.

As shown in FIGS. 4 to 8 and 9 to 12, in the TTL position, the seat squab is up at the back and the back rest is close to completely upright, with both the followers 27,44 at the rear, upper ends of their tracks. On initial movement of the linear actuator, or more particularly on control by the user of the seat to move from the TTL position, the back of the squab is dropped. The front of the squab is determined by the height of the pivot point 7 in the subframe 3, which remains fixed, save for slight forwards inclination of the linear bearings 2. Thus the seat squab tips back with slight concomitant reclining of the backrest, see FIG. 10. This is the user's sitting position with maximum leg room, although some users may find slightly more comfort by some by slightly more movement to incline the backrest further without change in the height of the back of the seat squab.

Further forwards movement keeps the seat squab with the follower 27 in the portion 15 of the first cam track. The back rest is progressively lowered by the second cam track, see FIGS. 5 & 11.

Figure 8:
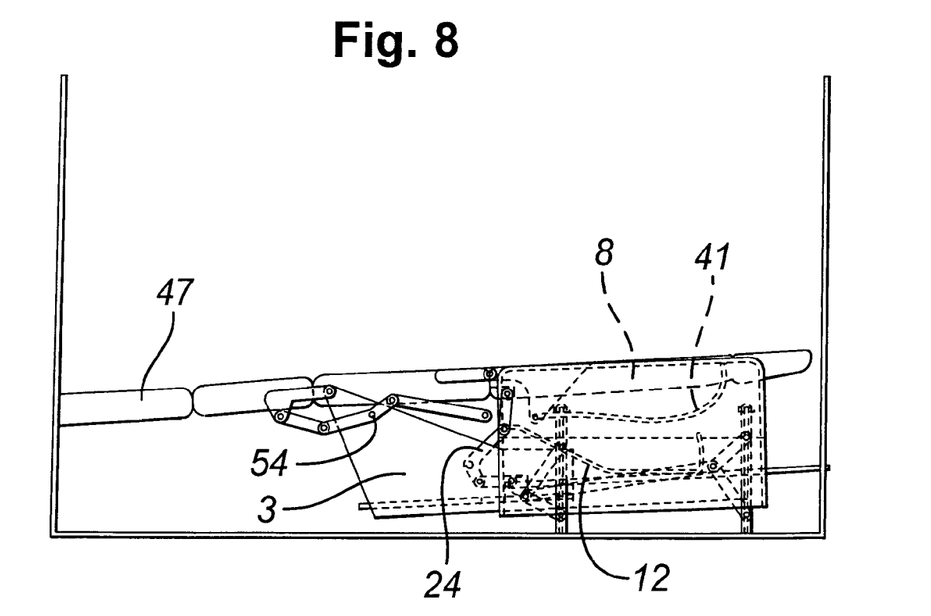
FIG. 8 is a similar view showing the leg rest deployed to the ottoman in bed position.
Figure 12:
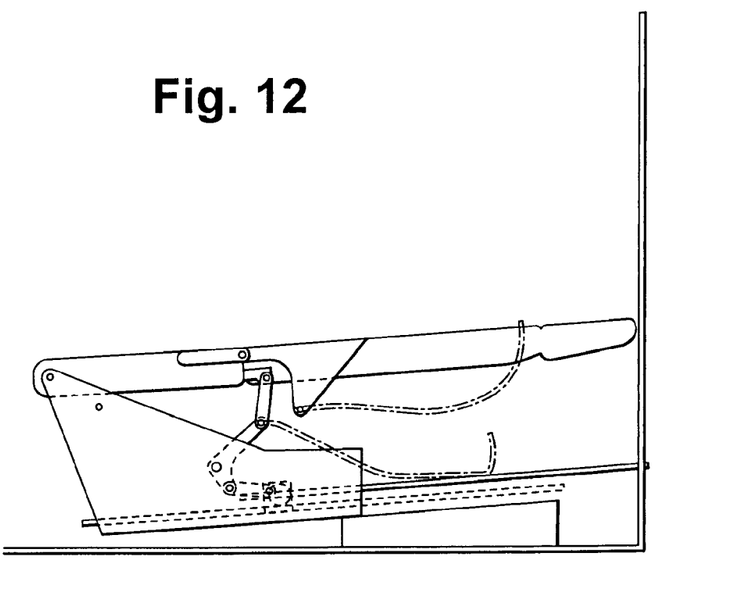
FIG. 12 is a simplified view of the seat in bed position.

Further movement still lifts the back of the seat squab via the first cam track portion 16. The back rest is lowered further. The bed mode is shown in FIGS. 8 and 12. The followers 27,44 enter short end portions 17, 46 of the cam tracks. The seat squab and backrest are aligned and coplanar with an ottoman 47. They are parallel with the linear bearings 2, which as noted above incline slightly downwards. This is the inclination of the seat as such in the bed mode.

Figure 13:
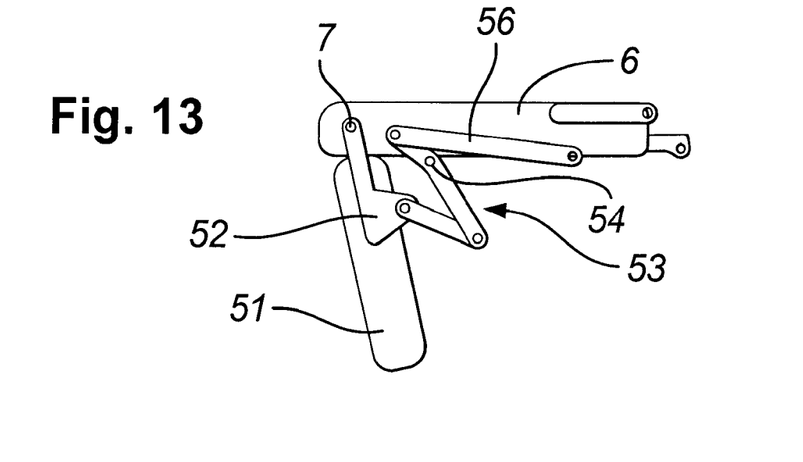
FIG. 13 is a scrap view of a leg rest of the seat of FIG. 1, with its Z linkage partially deployed.
Figure 14:
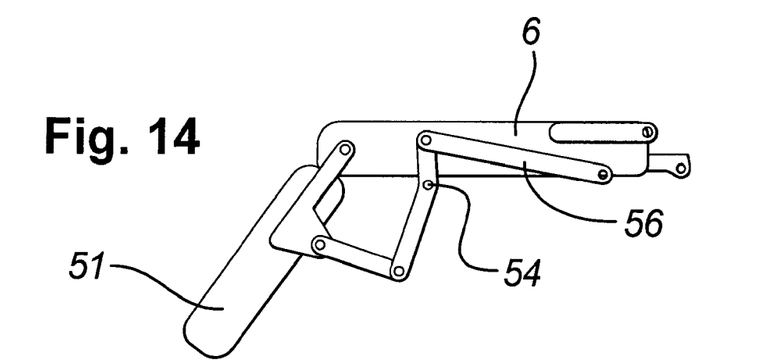
FIG. 14 is a similar view of the leg rest with the Z linkage most way deployed.
Figure 15:
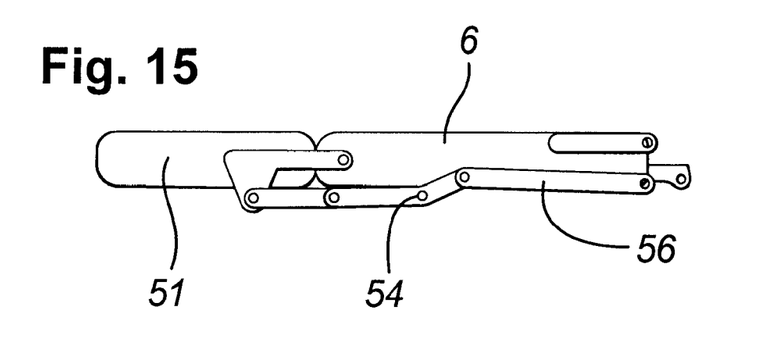
FIG. 15 is a similar view of the leg rest with the Z linkage fully deployed.

As seen in FIGS. 13,14,15, leg rest 51 is pivoted to the front of seat squab and the sub-frame at the pivot 7, via support plates 52 at each side. Each plate has an ear at which a Z linkage 53 is connected. A central pivot 54 of the linkage is to the sub-frame and a rear link 55 has a pin 56 received in a slot 57 in the cam plate 42. The pin 56 slides with lost motion in the slot until it reaches the front end of the slot, at least on forwards movement of the seat. This holds back the link 55, whereupon it pulls the Z linkage into an extended configuration, which lifts the leg rest 51 to fill the gap between the seat squab and the ottoman. On reverse movement on the seat, the pin 56 tends to move off the end of the slot, allowing the leg rest to droop. As the seat is moved rearwardly, the pin comes to the other end of the slot and forces the linkage to contract, pulling the leg rest under the front of the seat squab.

Figure 16:
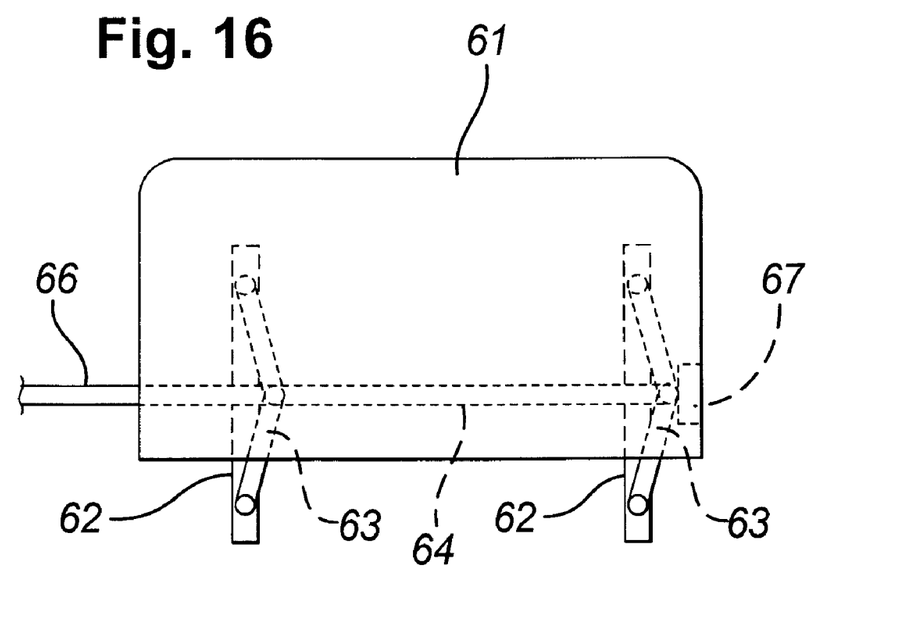
FIG. 16 is side view of an arm rest of the seat in raised, TTL position.
Figure 17:
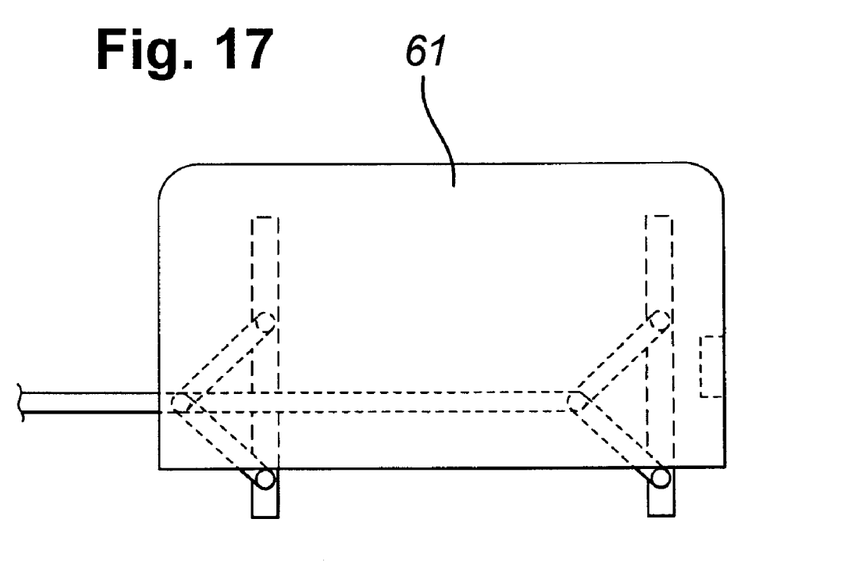
FIG. 17 is a similar side view of the arm rest fully retracted bed position.

An arm rest 61 adjacent the seat is supported on two pillars 62 for vertical extension. Each has a scissors mechanism 63 with a central link 64. A further link 65 extends to another lost motion slot 66, this in a subframe side plate 5, see FIG. 2. When the seat is in TTL position, the scissors mechanism is over-centre to the rear with the central link abutting a stop 67 on the arm. On forwards movement of the seat, after the lost motion is taken up, the links are pulled forwards, with the scissors mechanisms lowering the arm. On return movement, the arm is lifted again after the lost motion is taken up.

It will be noted that when the seat is in the TTL position, the cam followers are at the end of their cam tracks and the pins are at the ends of their lost motion slots. Thus the requirement for additional interlocks to hold the seat and its ancillaries in the TTL position is minimised.

The invention claimed is:

1. An aircraft seat comprising:
    a seat having:
        a squab and a backrest, both being movable and
        a seat chassis, via which the seat can be fixed to a floor,
    a mechanism for moving the squab and the backrest, the mechanism having:
        a linear runner mounted on the seat chassis,
        a seat frame sub-frame bearingly mounted on the linear runner,
            the squab being pivotally mounted on the sub-frame substantially at its front edge and
            the bottom of the backrest being pivotally mounted on the squab substantially at the back edge of the squab,
        linear drive means for extending and retracting the sub-frame on the runner with respect to the seat chassis between a retracted Taxi, Take-off and Landing position and an extended position,
        a first cam track in a first cam track member fast with the seat chassis for adjusting the height of the back edge of the seat squab, the first cam track being generally parallel to the linear runner through the majority of its length and having a rearmost substantially vertical portion,
        a first cam follower mechanism interconnecting the back edge of the seat squab, the first cam track, and the linear drive means for linear drive of the sub-frame with height adjustment of the rear edge of the seat squab,
            the arrangement being such that while the first cam follower mechanism is co-operating with the rearmost, substantially vertical portion of the cam track, the at least predominant effect of the linear drive means is lowering and raising of the rear of the seat squab with respect to the front of the seat squab,
        a second cam track fast with the seat chassis for adjusting the inclination of the backrest and
        a second follower connected to the backrest and engaged with the second cam track.

2. An aircraft seat as claimed in claim 1, wherein the first cam track is a single track in a single first cam track member arranged substantially centrally beneath the seat squab.

3. An aircraft seat as claimed in claim 1, wherein the second cam track is a pair of tracks in a pair of second cam track members arranged towards the sides of the seat squab.

4. An aircraft seat as claimed in claim 1, wherein the first cam track is a pair of tracks in a pair of first cam track members arranged towards the sides of the seat squab.

5. An aircraft seat as claimed in claim 4, wherein the second cam track is a pair of tracks in the pair of first cam track members.

6. An aircraft seat as claimed in claim 1, wherein the first cam follower mechanism comprises a bell crank pivoted at its elbow to the subframe, linked to the seat squab by an upper link pivoted to one arm of the crank, at which it engages the first cam track and linked to the drive means by a lower link pivoted to the other arm of the crank, the arrangement being such that, beyond a first portion of a stroke, linear movement of the drive means is converted to the linear movement of the sub-frame via the bell crank with or without adjustment of the height of the rear edge of the seat squab in accordance with the inclination of the first cam track with respect to the linear runner.

7. An aircraft seat as claimed in claim 6, wherein the bell crank is pivoted to the subframe above the linear drive means, with the one arm being directed backwards and the upper link extending upwards to the seat squab and the other arm being directed downwards with the lower link extending backwards to the drive means.

8. An aircraft seat as claimed in claim 1, including a leg rest pivoted to lift it from below the front edge of the seat squab and a mechanism for lifting the leg rest and a lost motion connection between the chassis and the mechanism operating at the end of forwards travel of the seat to cause the mechanism to deploy the leg rest.

9. An aircraft seat as claimed in claim 1, including an arm rest adjacent the seat squab, a mechanism for raising and lowering the arm rest and a lost motion connection between the mechanism and the sub-frame operating at the end of forwards travel of the seat to cause it to lower the arm rest.

10. An aircraft seat as claimed in claim 1, wherein the linear runner inclines slightly forwards with respect to the floor.

\* \* \* \* \*